June 25, 1963    V. SCHEUERMAN    3,094,756
AUTOMATIC LOCKING SLIDERS FOR SLIDE FASTENERS
Filed April 26, 1960    2 Sheets-Sheet 2
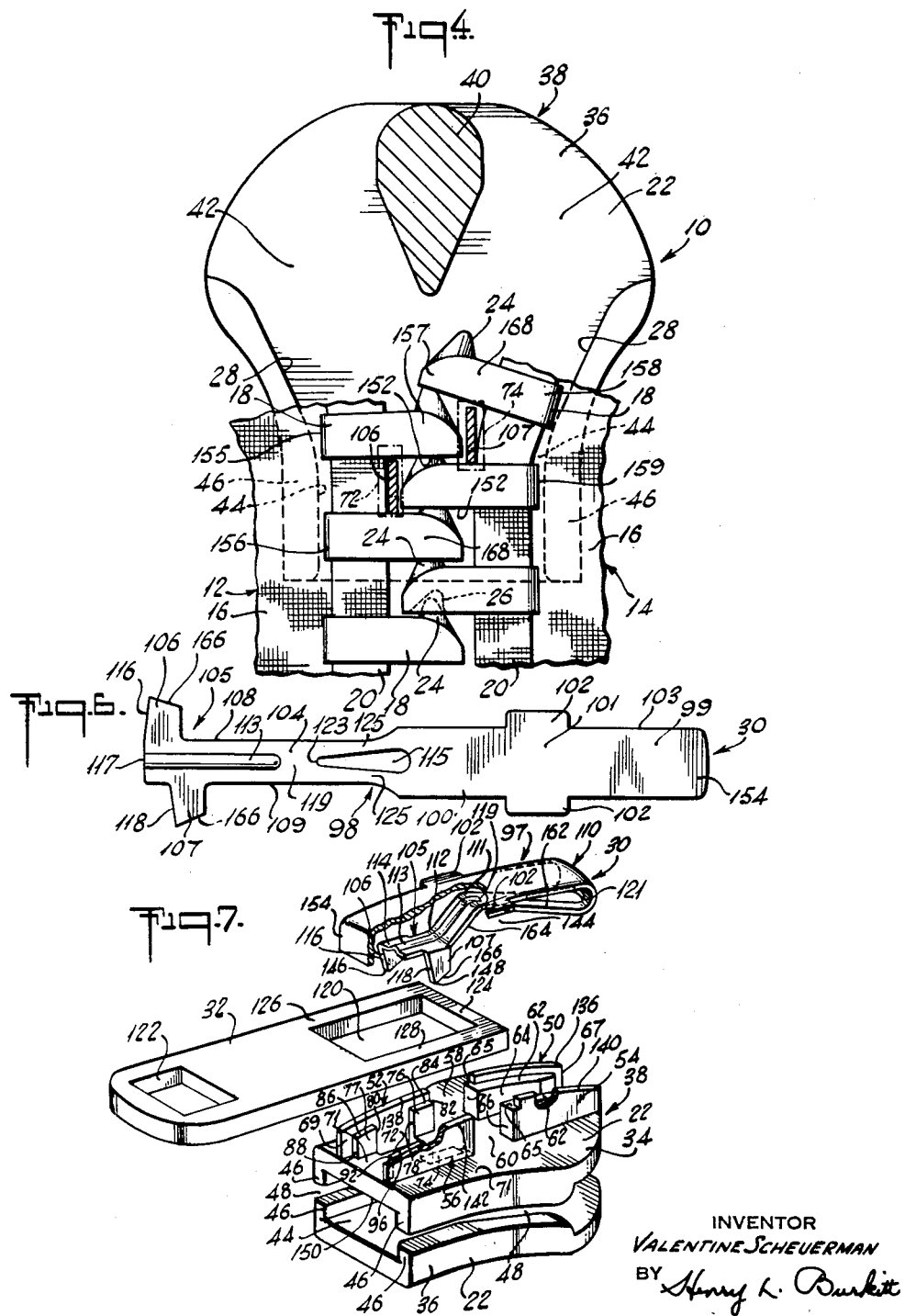
INVENTOR
VALENTINE SCHEUERMAN
BY Henry L. Burkitt
ATTORNEY

United States Patent Office 3,094,756
Patented June 25, 1963

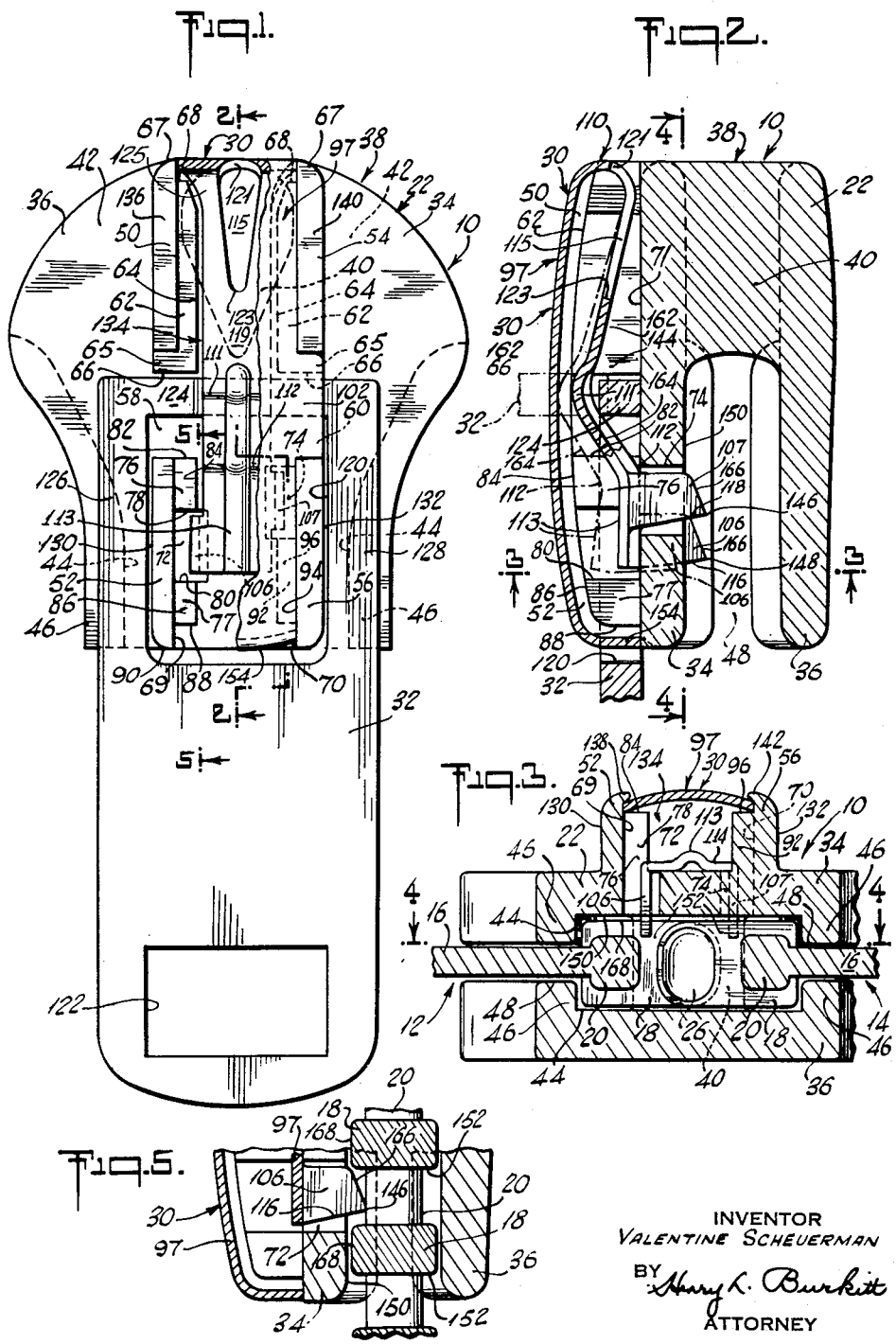

3,094,756
AUTOMATIC LOCKING SLIDERS FOR SLIDE FASTENERS
Valentine Scheuerman, Mountainside, Westfield, N.J., assignor to Ernst Industries, Inc., Long Island City, N.Y., a corporation of New York
Filed Apr. 26, 1960, Ser. No. 24,770
3 Claims. (Cl. 24—205.14)

This invention relates particularly to automatic locking sliders for slide fasteners.

In many different types of locking sliders, the interlocked elements of the slide fastener are engaged, but only elements on a single side of the interlocked stringers are engaged in such cases. In some methods, there is "locking" but without positive action. It is an object of the invention to provide a device by which fastener elements on both sides of the line of interlocked portions are automatically and efficiently engaged, and from which it is assured that stable anchorage is obtained by which torque or twist is substantially eliminated as a factor in the application of force by the device on opposite sides of the interlocked portions of the fastener elements.

It is an object of the invention to provide a device in which a locking element which has substantially rigidity in its engaging portion is automatically disengaged from the fastener elements when a force is applied to the pulling element ordinarily provided with a slider, and thus the slider is released for movement along the elements, but wherein, upon release of the pulling force on the pulling element, portions of fastener elements on both sides of the interlocked portions, substantially rigid with respect to each other and resisting distortion, automatically are engaged to lock the slider against movement in an opening direction.

It is an object of the invention to provide a spring for association with a slider which automatically engages against portions of slide fastener elements on both sides of the interlocked portions of a stringer, where such spring has, as an integral portion thereof, prongs positioned on opposite sides of the interlocked portions and substantially rigidly associated with each other, and related to each other positively to engage against the side faces of the fastener elements to limit rearward movement of the slider until such prongs are completely disengaged from such side faces.

It is an object of the invention to provide a construction for an automatic locking element for a slider which is held in place by the manner in which the locking element is assembled in the slider body, and which thereby imparts to itself rigidity as well as elasticity to engage opposed ends with slide fastener elements to anchor against the fastener elements without twist or torque.

It is an object of the invention to provide a slider body with which is associated a spring member having end prongs for engagement with the side faces of slide fastener elements, where the angle of the faces of the prongs is such that, when the prongs are engaged with the slide fastener elements, substantially positive face-to-face engagement results so that the prongs may not disengage by reason of any cam force against the end faces of the prongs.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or of any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

This application is a continuation-in-part of application Serial No. 676,764, filed August 7, 1957, now abandoned.

On the drawings, in which the same reference characters refer to the same parts throughout, and in which is disclosed such a practical construction, FIG. 1 is a plan view, to enlarged scale, of a slider embodying features of the invention, parts being broken away to illustrate details of construction;

FIG. 2 is a vertical cross-sectional view, substantially on the line 2—2 of FIG. 1, illustrating the construction of the slider body, together with the spring catch for engaging elements of a slide fastener stringer, the prongs of the catch being shown in full lines for the normal position of the catch, and in dot-and-dash lines for the position they assume when they are forced out of engagement with the fastener elements, a portion of the tab being broken away and the tab being shown in full lines in a normal position, and in dot-and-dash lines in a position to which it may be turned to disengage the catch;

FIG. 3 is a transverse vertical cross-sectional view, substantially on the line 3—3 of FIG. 2, illustrating the manner the tapes are located with the interlocked elements so that the prongs of the locking catch of the slider may cooperate therewith, the tab not being shown;

FIG. 4 is a horizontal cross-sectional view, substantially on the line 4—4 of FIGS. 2 and 3, illustrating the disposition of the latching prongs of the catch in relation to the interlocked slide fastener elements and the tape edges, only a portion of the slide fastener located within the slider passages being shown;

FIG. 5 is a cross-sectional view, substantially on the line 5—5 of FIG. 1, of a detail, illustrating the relationship of the prongs of the catch to the fastener elements when the fastener elements and the tape are inserted through the slider and the locking catch has been projected into position to engage against such fastener elements;

FIG. 6 is a plan view of the stamping of the spring member from which the locking catch is formed, the spring member being shown in developed position before it is bent into its final configuration, but showing the form it assumes after several of the forming operations have been completed; and FIG. 7 is an exploded view, to a scale larger than the actual size, showing the various parts making up the locking slider as they appear when separated, but still relatively in the same position they assume when the parts are assembled, parts of the rails of the slider body being broken away to illustrate a part of the ledge upon which the spring-locking catch is supported.

On the drawings is shown a slider 10 (FIG. 3) assembled with a pair of stringers 12 and 14 made up of tapes 16 having elements 18 secured upon the beaded edges 20 of the tapes. Slider body 22 (FIG. 4) functions in the usual manner to cause elements 18 to separate from each other when the slider is moved in one direction, and to intermesh with each other when the slider is moved in the opposite direction. The elements have projections 24 and recesses 26 which interlock to hold the elements against separation, and thus to function as a closure.

Ordinary tension, applied to tapes 16 by the parts to which they are secured, may be sufficient to cause the elements, bearing against walls 28 of the slider, to separate so that the stringers will open up. A locking catch 30 is provided to prevent this action except when desired. Each slider generally carries a tab 32 by which a pulling force may be imparted to the slider body so that the body may be compelled to move relatively to the tapes and the elements, and thus effect interlocking and separation of the elements.

Slider body 22 may be made in any desired manner, as, for instance, by diecasting. Such a slider body may comprise a pair of wings 34 and 36, joined at the enlarged end 38 by a dividing wall 40. Wall 40, as shown, generally is triangular in form, in order to function as a cam for forcing elements 18 to diverge, and also to function together with walls 28 to provide passages 42 to guide the elements into the single passage 44 where the elements are forced into intermeshed relationship (FIG. 4).

Walls 28 may take the form of rails 46 formed at the edges of and integral with wings 34 and 36. Rails 46 extend from wings 34 and 36 to be spaced from each other (FIG. 3) a distance sufficient to permit tapes 16 to extend through a passage 48 thus formed. Elements 18, in such case, bear directly against rails 46, and are thus restrained against separation once they have been interlocked.

Wing 34 has a number of walls or rails 50, 52, 54 and 56 upstanding thereon. Rails 50 and 52 are in line; rails 54 and 56 are in line. These two pairs of aligned rails are separated by gaps 58 and 60. On rails 50 and 54, ledges are formed, providing opposed platforms 62 at the tops of side faces 64 of the rails, and platforms 65 at the end faces 66 of the rails at gaps 58 and 60. Platforms 62 terminate short of end faces 67 of rails 50 and 54, providing vertical faces 68 spaced inwardly from faces 67.

At the bottoms of rails 52 and 56, where their respective side faces 69 and 70 meet face 71 of wing 34, slots 72 and 74 are formed to extend through wing 34. Slots 72 and 74 are at different positions lengthwise of wing 34 for a purpose to be described. Bosses 76 and 77 project inwardly from face 69 of rail 52. Boss 76 has an end face 78, and boss 77 has an end face 80; end faces 78 and 80 are substantially coterminous with the end bounds of slot 72. Boss 76 and rail 52 have a common end face 82. Bosses 76 and 77 have platforms 84 and 86. Platform 84 terminates at the common end face 82 of boss 76 and rail 52. Platform 86 terminates at end face 88 of boss 77 which end face is spaced inwardly from end face 90 of rail 52.

On the other side, rail 56 has a single boss 92 associated with slot 74 and face 94 of rail 56 in the same manner as described for bosses 76 and 77 in relation to slot 72. In like manner, boss 92 has a platform 96 disposed in a manner similar to platforms 84 and 86.

Locking catch 30 (FIG. 7) may take the form of a spring 97 made from a blank 98 (FIG. 6). The blank shown has sections 99 and 100 substantially of the same width but separated by a section 101 which has wings 102 extending beyond the side edges 103 of sections 99 and 100. At the portion of blank 98 away from section 100, the blank tapers to a section 104 which terminates in a prong section 105. At the end of prong section 105 a pair of prong projections 106 and 107 extend laterally beyond edges 108 and 109. Prong projection 106 is at the very end of edge 108; prong projection 107 is spaced rearwardly from prong projection 106, but is on the opposite edge 109.

Blank 98, after the cutting thereof, and after the formation of stiffener rib 113 and relief opening 115, is bent (FIG. 7) to provide the looped end 110 between sections 100 and 104. Two crimps 111 and 112 are formed in section 104 after the formation of rib 113 and opening 115, and before looped end 110 is formed. Further in order to produce the necessary spring action, properly to move the very end 114 of prong section 105 downwardly toward top face 71 of wing 34, the blank, before it is bent to form looped end 110, is formed, as shown, to provide a rib 113 which is shown to extend from the very end edge 117 beside edge 116 to a position where, when the crimps 111 and 112 are formed, the rib will extend a short distance into and then will be filleted down to the level of the top face 119 of section 104. This formation of rib 113 will cause the finished prongs 106 and 107 to be positioned the proper distance apart to engage the predetermined fastener elements.

Opening 115 is formed by punching out a piece of metal, which extends from about the midpoint 121 of looped end 110 for a substantial distance into section 104. The opening, as shown, has its maximum extent at midpoint 121 and then tapers to its end 123. Thus a pair of high flexibility connections 125 are made to section 100 at looped end 110, permitting easy movement of prongs 106 and 107, to be described, while prong section 105 and its associated prongs 106 and 107 have a high degree of rigidity by reason of rib 113 and crimps 111 and 112.

Prongs 106 and 107 have been bent to extend substantially in the same direction, at right angles to the body of prong section 105. End face or edge 116 (FIG. 6) of prong projection 106 and end edge 118 of prong projection 107 preferably are disposed at an angle of 10° to the perpendicular to the respective edges 108 and 109 of section 104. This angularity, in certain relations, is effective in producing positive ultimate engagement of the prongs with the fastener elements in the manner to be described.

Tab 32 may be made in any suitable manner; usually it is made by stamping metal of proper gauge. The tab may be provided with an elongated opening 120, and another opening 122. Opening 120 provides a bar 124 which may be positioned and seated in gaps 58 and 60 and to extend across wing 34. The width of opening 120 is made such that side bars 126 and 128 bounding opening 120 straddle rails 52 and 56, fitting snugly but still being movable with relation to the outside faces 130 and 132 of the rails (FIG. 1).

To assemble these parts of the slider, tab 32 is positioned so that its bar 124 is seated within gaps 58 and 60, and so that the side bars 126 and 128 extend along outside faces 130 and 132. Spring 97 is dropped into space 134 between rails 50 and 52 on one side, and rails 54 and 56 on the other side. The very side edges of sections 99 and 100 rest on platforms 62, 84, 86, and 96. Wings 102 extend into gaps 58 and 60, and rest upon platforms 65 and against faces 82. Portions 136, 138, 140 and 142, which project from rails 50, 52, 54 and 56, respectively, beyond platforms 62, 84, 86 and 96, are peined over to engage against the top faces of sections 99 and 100, to hold the spring in position.

Prong section 105 turns downwardly and is housed between rails 50, 52, 54 and 56. Crimps 110 and 112 produce an opening 144 through which bar 124 extends. However, by reason of the bias effected by the crimps, prongs 106 and 107 are caused to project into slots 74 and 72. The spring action produced by connections 125 is soft, yet resilient enough for the instantaneous engagement of prongs 106 and 107. The rigidity obtained from rib 113 is such that force applied to prongs 106 and 107 by pressures against elements 18 are resisted without distortion of the spring body at that location. The lower end points 146 and 148 of the prongs extend below the bottom face 150 of wing 34, and are in position (Figs. 2, 3, 4 and 5) to engage against the side faces 152 of elements 18. End 154 of section 99 is bent into an end wall which seats against face 71.

Slots 72 and 74 are spaced (FIG. 4) so that prong 106 will engage between elements 155 and 156 on one side of the interlocked portions 157, while prong 107 will engage between elements 158 and 159 on the other side of the interlocked portions. The angle of end edges 116 and 118 is such that the prong edges positively engage against those end faces without being affected by camming action which might tend to separate the prongs from the elements, and destroy the locked engagement.

When the slider is at rest, prongs 106 and 107 are engaged between the elements of the slide fastener in the manner described. When tab 32 is grasped, its bar 124, which is capable of limited movement within gaps 58 and 60 lengthwise of the slider, will engage against either of walls 162 and 164 defined in section 104 by crimps 111 and 112. Prong section 105 thus is moved so that prongs 106 and 107 are lifted with relation to slots 72 and 74 to disengage the prongs from between the elements. The slider may then move lengthwise of the chain of interlocked elements. It makes no difference in which direction the tab is manipulated; lifting of the prongs to liberate the slider follows.

The two prongs 106 and 107, rigidly associated by rib 113 and engaged against elements on both sides of the interlocked portions, effect stability so far as the engaging prong section 105 is concerned. The tendency to twist that prong section, or its prongs, is eliminated. Interlocking is positive by reason of the rigid double prong arrangement. The angularity of end edges 116 and 118 adds effectiveness to the engagement with the side faces of the prongs to reduce the possibility that the prongs will be cammed out of the locked engagement. Faces 166 of the prongs, on the other hand, are at such angle that when the slider is pulled toward closed position of the chain, faces 166 cam and slide over the top faces 168 of the elements. However, any attempt to move the slider in the reverse direction results in engagement of end edges 116 and 118 against the side faces of elements 156 and 159, to stop further opening movement of the slider.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. A self-locking slider for slide fasteners, comprising a slider body having passages therein for receiving and guiding a pair of fastener element stringers and for compressing the fastener elements to intermesh and form a single fastener chain, said passages including a single passage for the intermeshed chain, the single passage having a wall, said wall having a recess formed on the outside thereof and a pair of openings extending from the recess through the wall to said single passage, the openings being disposed to be positioned on opposite sides of the intermeshed portions of the elements and spaced from each other lengthwise of the body substantially the thickness of a single element, a single spring member carried in the recess, the spring member being formed of a single substantially flat strip of flexible material bent back upon itself to form upper and lower sections, the lower section being spaced from the bottom of the recess to provide an access space, the lower section having prongs at the side edges and adjacent the free end of said section, the prongs being substantially parallel to each other and being spaced lengthwise from each other a distance equal to the thickness of a single element and being spaced laterally from each other and positioned in said openings, a rigidifying ridge in the lower section between and substantially parallel to the prongs, said lower section having an opening therethrough beyond the ridge to impart increased flexibility to the section without interfering with the rigidification of the prong end of the section, each prong having an end edge, the prongs normally being biased by flexure of the spring to move through said openings to engage between pairs of intermeshed elements with the end edges in position to bear against the side faces of a pair of intermeshed elements, the two prongs being positioned to engage between pairs of elements spaced from each other longitudinally of the intermeshed elements, and a pull tab for the slider, the pull tab having an arm positioned in the access space to produce a bias contrary to that of the spring to move the prongs out of bearing position on application of a pulling force to the tab.

2. A self-locking slider for slide fasteners, comprising a slider body having passages therein for receiving and guiding a pair of fastener element stringers and for compressing the fastener elements to intermesh and form a single fastener chain, said passages including a single passage for the intermeshed chain, the stringers when intermeshed having the elements of one stringer alternately disposed between the elements of the other stringer and the intermeshed elements then overlapping for only a portion of the tenglh of the elements, the single passage having a wall, said wall having ribs extending outwardly therefrom to define a recess and a pair of openings extending from the recess through the wall to said single passage, the openings being disposed to be positioned on opposite sides of the overlapped portions and spaced from each other lengthwise of the body substantially the thickness of a single element, a single spring member carried in and retained by said recess, the spring member being formed of a single substantially flat strip of flexible material bent back upon itself, one of the sections of the bent spring having prongs at its side edges and adjacent the free end of said section, the prongs being substantially parallel to each other and being spaced laterally and lengthwise from each other, a rigidifying ridge in the lower section between and substantially parallel to the prongs, said lower section having an opening therethrough beyond the ridge to impart increased flexibility to the section without interfering with the rigidification of the prong end of the section, the prongs normally being biased by flexure of the spring to move through said openings to engage between pairs of intermeshed elements at portions beyond the overlapped portions, the two prongs being positioned to engage between pairs of elements spaced from each other longitudinally of the intermeshed elements, and a pull tab for the slider, the pull tab having an arm encompassing certain of the ribs and positioned with relation to said sections to produce a bias contrary to that of the spring to move the prongs out of bearing position.

3. A self-locking slider for slide fasteners, comprising a slider body having passages therein for receiving and guiding a pair of fastener element stringers and for compressing the fastener elements to intermesh and form a single fastener chain, said passages including a single passage for the intermeshed chain, the stringers when intermeshed having the elements of one stringer alternately disposed between the elements of the other stringer and the intermeshed elements then overlapping for only a portion of the length of the elements, the single passage having a wall, said wall having ribs extending outwardly therefrom to define a recess and a pair of openings extending from the recess through the wall to said single passage, the openings being disposed to be positioned on opposite sides of the overlapped portions and spaced from each other lengthwise of the body substantially the thickness of a single element, a single spring member carried in and retained by said recess, the spring member being formed of a single substantially flat strip of flexible material bent back upon itself to form upper and lower sections, the lower section being formed to provide an access space, the lower section having prongs at its side edges and adjacent the free end of said section, the prongs being substantially parallel to each other and being spaced laterally and lengthwise from each other, a rigidifying ridge in the lower section between and substantially parallel to the prongs, said lower section having an opening therethrough beyond the ridge to impart increased flexibility to the section without interfering with the rigidification of the prong end of the section, the prongs normally being biased by flexure of the spring to move through said openings to engage between pairs of intermeshed elements at portions beyond the overlapped portions, the two prongs being positioned to engage between pairs of elements spaced from each other longitudinally of the intermeshed elements, and a pull tab for the slider, the pull tab having an arm encompassing certain of the ribs and positioned in said access space to produce a bias contrary to that of the spring to move the prongs out of bearing position, certain of the ribs providing means for engaging the upper section to retain the spring in the recess.

References Cited in the file of this patent

UNITED STATES PATENTS

| | | |
|---|---|---|
| 2,453,660 | Firing | Nov. 9, 1948 |
| 2,622,296 | Erdmann | Dec. 23, 1952 |
| 2,715,255 | Legat | Aug. 16, 1955 |
| 2,849,775 | Erdmann | Sept. 2, 1958 |

FOREIGN PATENTS

| | | |
|---|---|---|
| 432,088 | Great Britain | July 19, 1935 |
| 717,395 | Great Britain | Oct. 27, 1954 |